United States Patent
Richard et al.

(10) Patent No.: US 12,354,426 B2
(45) Date of Patent: Jul. 8, 2025

(54) AUTO-PROGRAMMING DOOR AND CAMERA RELATIONSHIPS FOR A SECURITY SYSTEM

(71) Applicant: Tyco Fire & Security GmbH, Neuhausen am Rheinfall (CH)

(72) Inventors: Brian Richard, Lunenburg, MA (US); David Monahan, Donaghadee (GB)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 329 days.

(21) Appl. No.: 17/817,066

(22) Filed: Aug. 3, 2022

(65) Prior Publication Data
US 2024/0046729 A1     Feb. 8, 2024

(51) Int. Cl.
*G07C 9/37*     (2020.01)
*G06V 40/16*    (2022.01)

(52) U.S. Cl.
CPC .............. *G07C 9/37* (2020.01); *G06V 40/166* (2022.01); *G06V 40/172* (2022.01)

(58) Field of Classification Search
CPC ....... G07C 9/37; G06V 40/172; G06V 40/166
See application file for complete search history.

(56) References Cited

U.S. PATENT DOCUMENTS

| 10,650,629 B1 | 5/2020 | Hutz et al. |
| 12,056,561 B1* | 8/2024 | Manchi ............. G06K 7/10336 |
| 2020/0159908 A1* | 5/2020 | Okuyama ............... G06F 21/45 |
| 2022/0215706 A1 | 7/2022 | Wakako et al. |

FOREIGN PATENT DOCUMENTS

| EP | 2642454 A1 | 9/2013 |
| EP | 3992931 A1 | 5/2022 |
| WO | 2016086315 A1 | 6/2016 |

OTHER PUBLICATIONS

International Search Report and Written Opinion in PCT/US2023/071158, mailed Nov. 24, 2023, 14 pages.

* cited by examiner

*Primary Examiner* — David Perlman
(74) *Attorney, Agent, or Firm* — ArentFox Schiff LLP

(57) ABSTRACT

A method for automatically programming a security system including a plurality of access control readers and a plurality of image sensors includes receiving user credential information from a first access control reader. A first door associated with the first access control reader is further associated with a first image sensor. A user is identified based on the user credential information and based on visual content provided by the first image sensor. Upon receiving the user credential information from one or more access control readers of the plurality of access control readers different from the first access control reader, the user is reidentified based on visual content provided by the plurality of the image sensors. The image sensor that provided the visual content used for reidentification of the user is associated with a door associated with the access control reader that provided the user credential information.

16 Claims, 5 Drawing Sheets

AUTO-PROGRAMMING DOOR AND CAMERA RELATIONSHIPS FOR A SECURITY SYSTEM

FIELD

The present disclosure relates generally to building systems. More particularly, the present disclosure relates to a method for auto-programming door and camera relationship for a security system.

BACKGROUND

The mapping of relationships between various distributed sensors in a security system is typically a time consuming task that is performed manually by experts. The mapping process requires a good understanding of systems operation in order to identify and program appropriate values for various parameters. Furthermore, for a particular building, mapping relationships between doors and corresponding cameras and other security devices monitoring each of the plurality of doors may involve manually programming thousands of one to one links.

Moreover, with increasing demand for integration of automated components and cameras with traditional security systems, facilitated configuration of components and controllers is increasingly becoming a necessity for new generations of building automation and security systems as such configuration can potentially reduce to a minimum the effort and knowledge required for installing these systems.

Nevertheless, traditional techniques typically require manual intervention once the components have been deployed. Traditional techniques also require a systems architect to create network schemes manually prior to deployment or require passing some configuration to the components by coming in close proximity with the component.

Such conventional methods and systems have generally been considered satisfactory for their intended purpose. However, there is still a need in the art for an improved system and method for auto pairing of security system components.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for automatically programming a security system comprising a plurality of access control readers and a plurality of image sensors includes receiving user credential information from a first access control reader. A first door associated with the first access control reader is further associated with a first image sensor. A user is identified based on the user credential information and based on visual content provided by the first image sensor. Upon receiving the user credential information from one or more access control readers of the plurality of access control readers different from the first access control reader, the user is reidentified based on visual content provided by one or more image sensors of the plurality of the image sensors. The image sensor that provided the visual content used for reidentification of the user is associated with a door associated with the access control reader that provided the user credential information.

In another aspect, a system for automatically programming a security system comprising a plurality of access control readers and a plurality of image sensors includes a hardware processor and memory including instructions that, when executed by the hardware processor, cause the system to receive user credential information from a first access control reader, wherein a first door associated with the first access control reader is further associated with a first image sensor; identify a user based on the user credential information and based on visual content provided by the first image sensor; reidentify, upon receiving the user credential information from one or more access control readers of the plurality of access control readers different from the first access control reader, the user based on visual content provided by one or more image sensors of the plurality of the image sensors; and associate the image sensor that provided the visual content used for reidentification of the user with a door associated with the access control reader that provided the user credential information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide methods for automatically programming relationships between various devices in a security system. A correlation map indicating relationships between security devices may be generated based on reidentification information of users as they travel around a site/building trying to access various access points. Moreover, the generated correlation map may be used by security personnel to identify nearby doors that might need to be disabled/locked in case of a security incident.

Turning now to the figures, example aspects are depicted with reference to one or more components described herein, where components in dashed lines may be optional.

Figure 1:
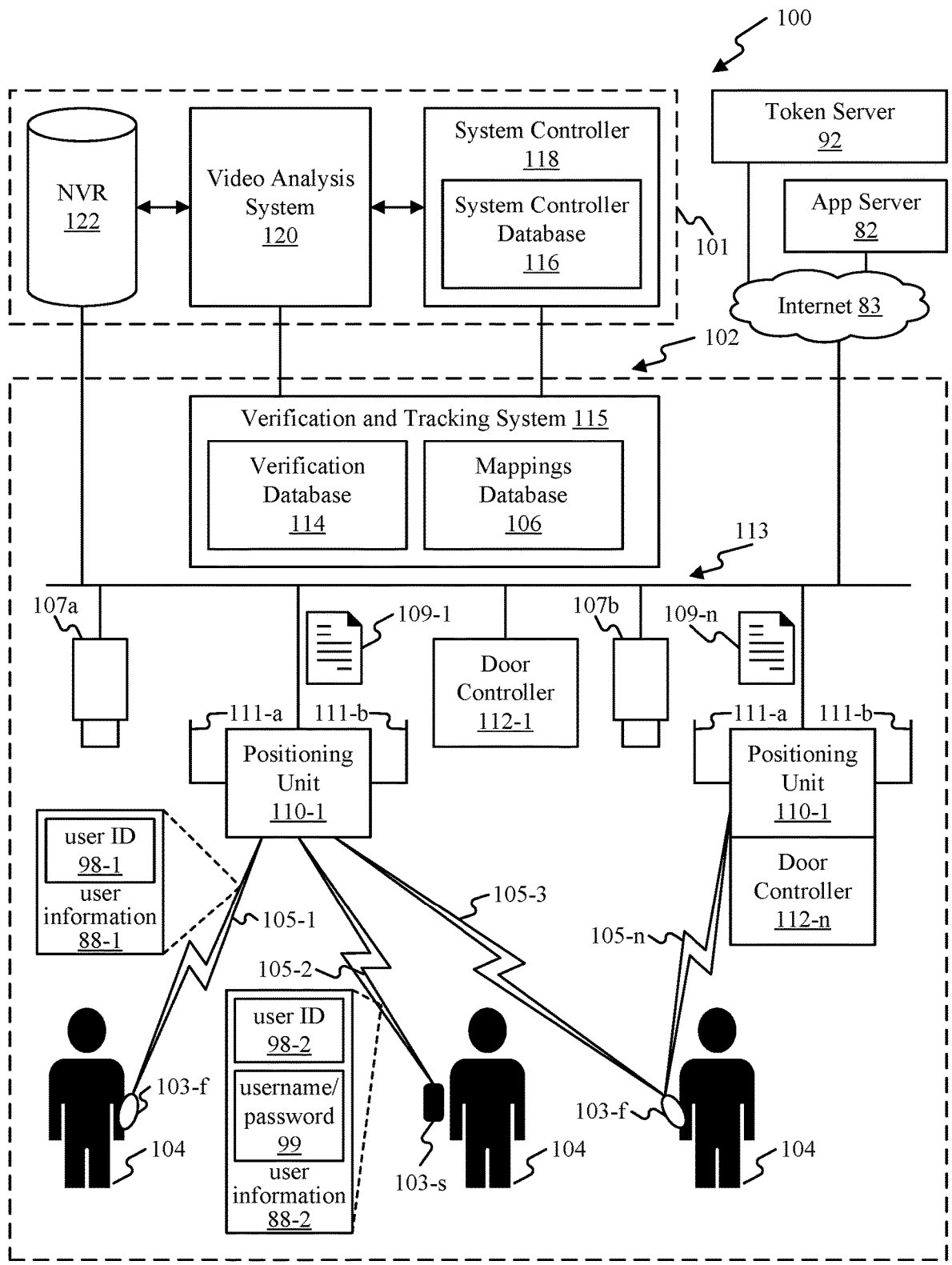
FIG. 1 is a schematic diagram of an example security system that identifies users, tracks locations of active wireless devices, and controls access to different and/or restricted areas, in accordance with aspects of the present disclosure.

Referring now to FIG. 1, there is provided a schematic diagram of an example security system 100 that identifies one or more users 104, tracks locations of user devices 103, such as fobs 103-*f* and/or smart phones 103-*s* or other mobile computing devices, and enables access to restricted areas of a premise 102. In the example, the security system 100 is distributed between two or more locations or buildings 102. The system may also include backend components such as a system controller 118, a video analysis system 120, and a network video recorder 122 (described in greater detail below) that are typically located in a security control room 101 or other secure location of the building 102. Alternatively, one or more of these components could be part of a remote service network such as a cloud-based network, or "cloud" or could be part of another building associated with the security system 100.

The system 100 also includes a verification and tracking system 115, and image sensors 107, e.g., video cameras, and may further include additional components such as positioning units 110, and door controllers 112. These devices are usually located within and/or adjacent to the building 102 that is being protected and/or secured by the system 100. These components communicate with one another over a data network 113. The positioning units 110 are located near access points of the building 102 or areas within the buildings such as door access points that enable users 104 to physically enter or exit the building 102 or access different parts. On the other hand, the verification and tracking system 115 may typically control multiple positioning units 110. However, in some still other implementations, the verification and tracking system 115 could be integrated in the same box as the positioning unit 110.

In one or more embodiments, users 104 may carry user devices 103 (e.g., fobs, smartphones, tablets, phablets, or other mobile computing devices), which broadcast packet data 105-1 to 105-*n*. The packet data 105 may include user information 88 for identifying an associated user. In one or more embodiments, users 104 may carry access cards containing user information 88. The user information 88 may include a unique user ID 98 for each of the user devices 103. The user information 88 may further include other information for identifying the user such as a username/password 99, name of user, department, work extension, personal phone numbers, email addresses, and employee ID number, in examples. In one example, the user ID 98 includes a token or a hash of the token generated for the user 104, and a token may or may not expire after a predetermined time.

In yet another example, a rolling security identification (ID) or access code generated within the user device 103 as the user ID 98. A rolling access code may be a unique authentication code for each user 104.

Users carrying the user devices 103 may enroll and/or register the user devices 103 with the system controller 118. When the user device is a fob 103-*f*, users may access the system controller 118 to enroll the fob via a client application of the system controller 118. When the user device is a smart phone or other mobile computing device, 103-*s*, the users 104 may download a security app (i.e., a downloadable self-contained software application) from the app server 82 to their user device 103-*s*, where the security app provides access to the system controller 118.

During the enrollment/registration process, the users 104 may enter the user information 88 to create a user account 19 for each user on the system controller 118. In an aspect, the user account 19 may be created by an administrator based on the user information 88. For a fob user device 103-*f*, users provide the unique ID of the fob such as its Media Access Control (MAC) address as the user ID 98-1 of the user information 88-1. For a mobile phone (e.g., "smart phone") user device 103-*s*, users typically include the phone number of the user device 103-*s* as the user ID 98-2 of the user information 88-2. Users can additionally include other user information 88 for identifying the users such as a username/password combination 99. In response, a user account 19 is created on the system controller 118 for the user with the specified user information 88.

An administrator may add authorization information associated with each of the users 104 to the user account 19 based on security objectives. Authorization information determines which users 104 are authorized to access specified restricted buildings or restricted areas of a building 102. In one implementation, the authorization information may be provided as a separate access control list for each door controller 112, where the authorization information includes the user information 88 of users that are authorized to access each door controller 112. In another implementation, the authorization information may be a single access control list that identifies all door controllers 112-1 through 112-*n* and the users that are authorized to access the door controllers 112-1 through 112-*n*.

When enrolling a smart phone user device 103-*s* with a token as the user ID 98, the smart phone user devices 103 and the system controller 118 may first access a token server 92 to request the token. In one implementation, the user, via the security app, may include the phone number of the user device in a request message to the token server 92. In response, the token server 92 may generate a token, and may send the token to both the system controller 118 and the user device 103 in response. The token server 92 preferably sends the token to the user device in an SMS message. The token may then be included as the user ID 98 within the user information 88 for the user, for both the user information 88 maintained for the user in the system controller 118 and the user information 88 included within the user device 103.

The wireless packet data broadcast from the user devices 103 is preferably secured to prevent unauthorized third parties from intercepting and viewing the packet data 105 during transmission (i.e. during broadcasts). In one example, the packet data 105 may be encrypted. In a preferred embodiment, the user devices 103 may broadcast the packet data 105 using BLE (Bluetooth low energy) technology.

In an alternative implementation, the user devices 103 may be capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples.

In an aspect, the positioning units 110 each may include two or more antennas 111. The packet data 105 may be received by antennas 111-*a*, 111-*b* of one or more positioning units 110-1 to 110-*n*, which may be located throughout the building 102. The positioning units 110-1 to 110-*n* may determine locations of the users 104 using one or more positioning techniques.

A preferred positioning technique may compare the relative signal strengths of the received wireless signals between two antennas 111 of the positioning unit 110.

Another positioning technique may include determining time of flight or time of receipt of packet data 105 received at each of the antennas 111 of a positioning unit 110. In yet another positioning technique example, the positioning units 110 may employ triangulation between two or more positioning units 110 installed within the building. The positioning units 110 may convert the locations of the users 104 into location data 109 for each of the users. This will typically require the positioning units to share a common reference clock.

As the users 104 and their user devices 103 move through the building 102, the tracking of the user devices 103 and therefore of the users 104 is often "handed off" to other positioning units 110 in order to reduce or eliminate tracking blind spots within the building 102.

The verification and tracking system 115 may access authorization information in a verification database 114, to determine which users 104 are authorized to access specified restricted areas of a building 102 and/or pass through an access point. Once the users 104 are authenticated by the verification and tracking system 115, the verification and tracking system 115 may send a door control signal via the network 113 to the door controller 112-1, in one example. The door controller 112-1 may then enable access to a restricted area by unlocking an access point of the restricted area, such as a door, thereby providing access for the authorized user 104 to the restricted area while also possibly generating an alarm for an unauthorized user. The door controller 112-1 preferably unlocks the door when the authorized user 104 is within a threshold area 131 near the access point (e.g., the door or other portal) of the restricted area.

The door controllers 112-*n* can also be directly coupled with the positioning units 110-*n*. In this implementation, the verification and tracking system 115 may send door control signals via the network 113 to the positioning units 110-*n*, which in turn may activate their door controllers 112-*n* to enable access to the restricted areas.

The verification and tracking system 115 may access the user information 88 and authorization information within the verification database 114, which acts as a local copy or "cache" of the information. To manage the temporal relevance of the entries in the verification database 114, the verification and tracking system 115 maintains a current time, and applies a time stamp to each item of user information 88 and authorization information received from the system controller 118.

In the exemplary system 100, the image sensors 107 may record video data, which are sent via the network 113 to the network video recorder 122 to store the video data. Typically, time and date information may be added to video data to enable the data to be indexed and reviewed at a later date. This information is also known as video metadata. The video analysis system 120 may analyze video data and may associate metadata to moving objects (e.g., people), numbers of moving objects, and specific users, to list a few examples.

The verification and tracking system 115 may then send the location data 109 in conjunction with the video data from the image sensors 107 to the video analysis system 120 for analysis. The video analysis system 120 typically analyzes the location data 109 with the video data from the image sensors 107 to verify that the user is a proper user and to identify user's location. In one example, video identification information such as facial image information that the video analysis system 120 determines from the video data may be used to confirm that the individuals possessing the user devices 103 are the proper users 104. This safeguards against an event such as when a user device 103 for a valid employee user 104 of a business is stolen or lost, and a different individual (e.g., other valid user 104, former employee of the business, or unauthorized user) attempts to gain access to a restricted area of the building via the user device 103. In other examples, the video analysis system 120 may analyze the tracking information provided by the location data 109 in conjunction with the video data to determine which individuals in a scene are users (holding users devices 103) and which are non-users (not holding user devices 103).

The video analysis system 120 typically combines the tracking information generated by the tracking and verification system 115 with the video data from the image sensors 107. The video analysis system 120 determines video identification information of the users from the video data. The video identification information may include, but is not limited to, facial image information and gait information of the users, and other physical characteristics that are possibly unique to the user such as clothing worn, a person's stature, and tattoos, in examples. The facial image information, in examples, may include one or more images of the user's face, or 2D or 3D vectors of facial landmarks associated with a person's facial image using facial recognition algorithms.

The video identification information determined from the video data may be used to confirm that the individuals possessing the user devices 103 are the proper users.

In order for the security system 100 to work as described above, relationships between a plurality of doors and corresponding image sensors 107, positioning units 110 and other security sensors monitoring each of the plurality of doors need to be programmed, which may involve manually programming, at least in some cases, thousands of one to one links.

Figure 2:
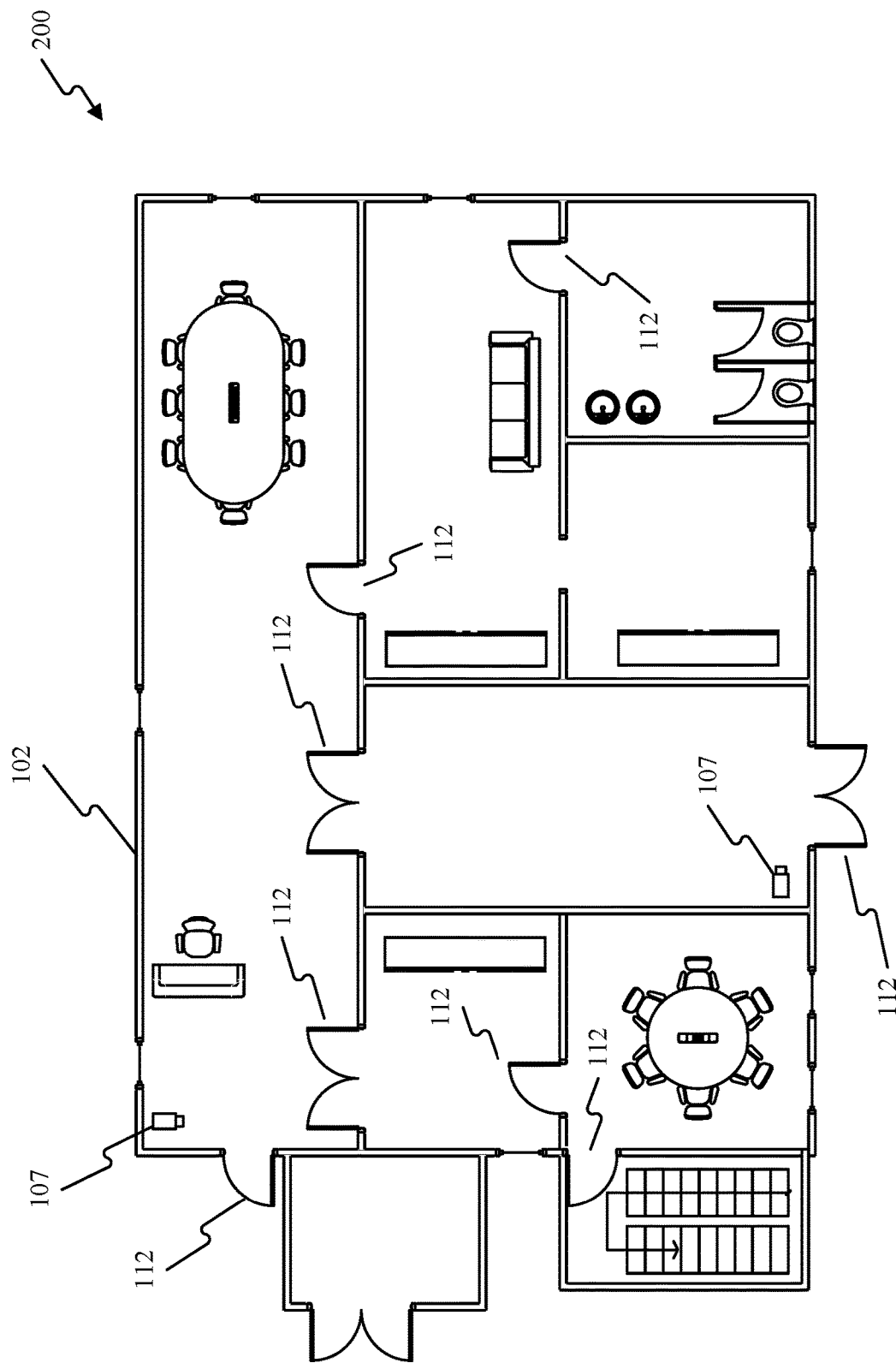
FIG. 2 is an illustration of an example floor plan that may be used by a security system according to some aspects of the present disclosure.

Referring now to FIG. 2, there is an example floor plan 200 that may be used by a security system 100 according to some present aspects. In an aspect, the verification and tracking system 115 may be configured to recognize and re-identify authorized users 104 across different image sensors 107 by using the video analysis system 120. In an aspect, a relationship between one door and one sensor may be pre-programmed. For example, the relationship between the first door controller 112-1 and the first video camera 107*b* may be programmed in the mappings database 106. In an aspect, once the authorized user 104 is identified by the door controller 112-1, as described above, and an image of the authorized user 104 is captured by the video camera 107*b*, both user information 88 and image of the user 104 may be transmitted to the verification and tracking system 115. Subsequently, as the authorized user moves around the building 102 and the verification and tracking system 115 tracks the movement of the authorized user 104, it may generate a map of relationships between a plurality of doors and a plurality of monitoring security devices. For example, once the verification and tracking system 115 receives the same user information 88 from a different door controller 112 and the image of the user is captured by another video camera 107, the verification and tracking system 115 may determine that there is a relationship between such second door controller 112 and the second video camera 107.

FIG. 2 illustrates that there may be a plurality of door controllers 112 positioned at different doors within the building 102. Each of these doors may be monitored by one or more image sensors 107, one or more positioning units 110, and the like. In an aspect, the video analysis system 120 may be configured to reidentify the authorized user 104 based on visual content criteria. Original identification of the authorized user 104 may happen at the first door upon the authorized user 104 entering the building 102. The verification and tracking system 115 may be configured to continue the reidentification process as the authorized user 104 moves around the building 102. In an aspect, the visual content criteria may include but is not limited to: user clothing color, user hair color, user height, user gait and user body shape.

In an aspect, the security system 100 may utilize the mappings database 106 in the event of security breach. For example, upon receiving an alert from the system controller 118 indicating unauthorized entry by a potential intruder (i.e. an unauthorized user), the verification and tracking system 115 may utilize the automatically generated correlation map stored in the mappings database 106 to identify an image sensor associated with the access control reader that generated the alert. Quicker identification of such image sensors, as compared to conventional methods, enables the security system 100 to verify current location of the potential intruder and helps to identify all other security devices in the vicinity of the detected security incident in an efficient manner in order to successfully track and investigate the security incident. In an aspect, the verification and tracking system 115 may lock the potential intruder in area where the potential intruder can be apprehended.

In an aspect, the verification and tracking system 115 may receive a floor map, such as floor map 200, as an input parameter. Such floor map 200 may provide information about layouts, numbers of doors on each floor of the building 102, and the like. In an aspect, the verification and tracking system 115 may be configured to generate the correlation map specifying relationships between doors and security devices based on the provided floor map 200. It should be noted that such relationships are not necessarily one to one relationships. In other words, in some locations there might be multiple image sensors 107 monitoring a single door.

In an aspect, the verification and tracking system 115 may be configured to utilize a machine learning model for reidentification of authorized users 104. The machine learning model may, in some aspects, implement a plurality of video analysis models capable of performing distinct computer vision tasks and feature detection. Using the combined machine learning model, the one or more aspects of the present disclosure may function to process many aspects of video input, in parallel or synchronously, to achieve comprehensive detection results in real-time (or near real-time) and provide actionable intelligence for increased environment security and/or safety, rapid (real-time) emergency response and/or incident response, rapid threat response, and the like. In this way, the feature outputs of the machine learning model may be composited in such a manner to extract mutual information (e.g., where information of feature outputs overlap) existing between distinct feature outputs from each of the distinct video analysis models.

In an aspect, the video analysis system 120 may implement a deep learning model that comprises an ensemble of disparate machine learning models for accomplishing a plurality of computer vision tasks and the like. As an initial step, the method 200 may identify and/or extract high-level features (e.g., contours of people and other elements within the image data) of the image data that the video analysis system 120 may pass to a subset of the ensemble of machine learning models for feature detection, feature classification, and processing.

Figure 3:
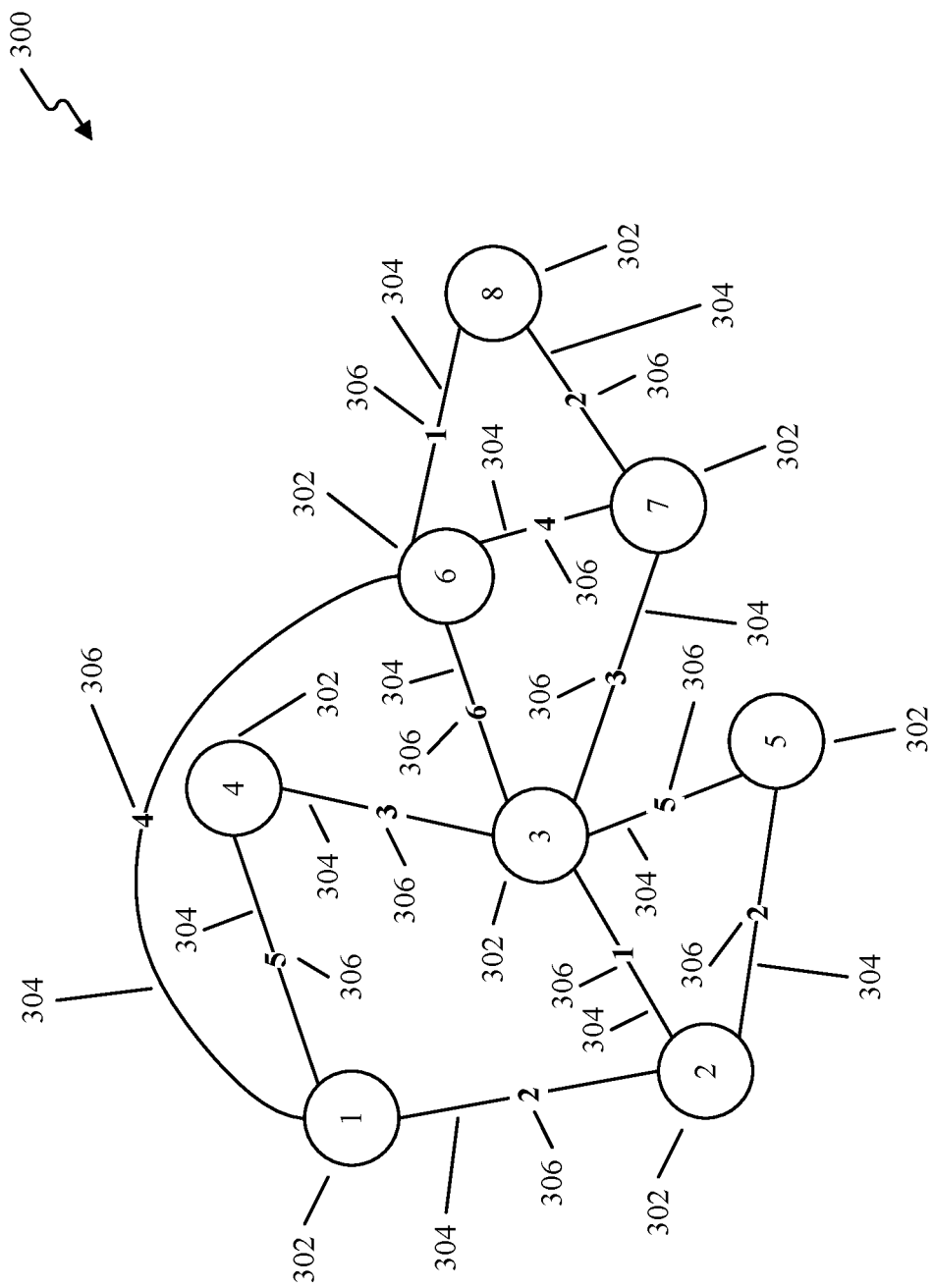
FIG. 3 is an illustration of an example of a correlation map according to some aspects of the present disclosure.

FIG. 3 is an illustration of an example of a correlation map according to some present aspects. The correlation map 300 is representative of a correlation map identifying relationships between a plurality of doors and a plurality of security devices within the building 102. In the correlation map 300, each circle may represent a unique security sensor 302, such as a video camera 107, positioning unit 110 (shown in FIG. 1) and the like. A path 304 between two security sensors 302 illustrates identification of an authorized user 104 in order of the sensors.

In an aspect, the verification and tracking system 115 may assign a numeric value 306 to each path 304 within the correlation map 300. In an aspect, the numeric value 306 may indicate a number of times a corresponding path is travelled by the authorized user 104. In an aspect, the higher the numeric value 306, the stronger the relationship between security sensors 302. In an aspect, the verification and tracking system 115 may also assign an average travel time (not shown in FIG. 3) to each path 304. In an aspect, a shorter path 304 (i.e., lower average travel time) may indicate direct relationship and close proximity between the corresponding security sensors 302. On the other hand, a longer path 304 (i.e., higher average travel time) may indicate greater distance and loose proximity between the corresponding security sensors 302. In an aspect, no path 304 between some security sensors 302, may indicate that those sensors 320 are not sequential (i.e., not related).

Figure 4:
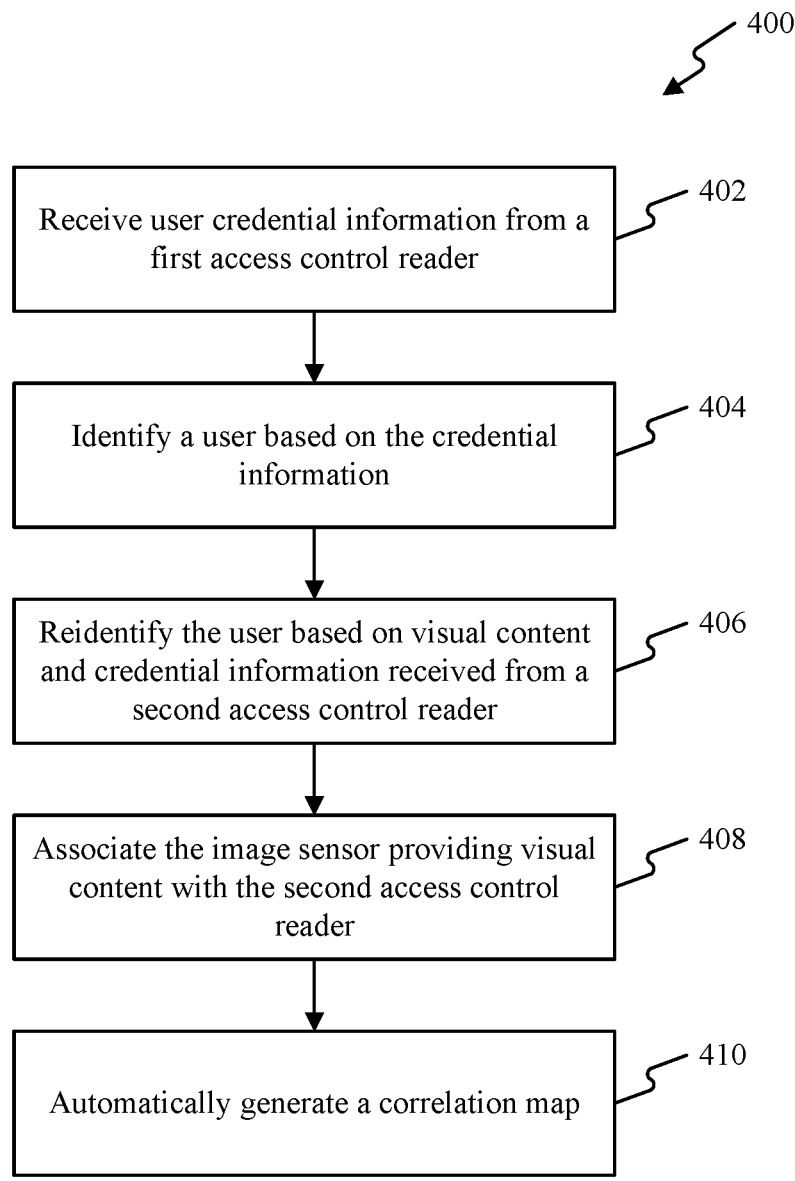
FIG. 4 is a flowchart of an example method for automatically programming a security system, in accordance with aspects of the present disclosure.

FIG. 4 is a flowchart of an example method for automatically programming a security system, in accordance with aspects of the present disclosure. FIGS. 1-3 may be referenced in combination with the flowchart of FIG. 4.

At 402, the verification and tracking system 115 may receive user credential information from the first access control reader. In an aspect, the user credential information may include user information 88 and the first access control reader may be the first door controller 112-1. In addition, a first door associated with the first door controller 112-1 may be associated with a first image sensor, such as a video camera 107*b*. This association between the first door and the video camera 107*b* may be preprogrammed and stored in the mappings database 106. In one implementation, the authorization information may be provided as a separate access control list for each door controller 112, where the authorization information includes the user information 88 of users that are authorized to access each door controller 112. The user credential information may include date and time information indicating a time instance at which the user 104 provided a credential to a corresponding door controller 112.

At 404, the verification and tracking system 115 may identify and authenticate the user based on credential information. In one implementation, the verification and tracking system 115 may send door control signals via the network 113 to the positioning units **110-*n*, which in turn activate their door controllers 112-*n* to enable access to the restricted areas. The verification and tracking system 115 may access authorization information in a verification database 114 to determine which users 104 are authorized to access specified restricted areas of a building 102 and/or pass through an access point. Once the users 104 are authenticated by the verification and tracking system 115, the verification and tracking system 115** may send a door control signal via the network 113 to the door controller 112-1, in one example. The door controller 112-1 may then enable access to a restricted area by unlocking an access point of the restricted area, such as a door or other portal, thereby providing access for the authorized user 104 to the restricted area while also possibly generating an alarm for an unauthorized user. The verification and tracking system 115 may then send the location data 109 in conjunction with the video data from the image sensors 107 to the video analysis system 120 for analysis. The video analysis system 120 typically analyzes the location data 109 with the video data from the image sensors 107 to verify that the user is a proper user and to reidentify the user in other locations within the building 102.

At 406, if the user 104 attempts to access another restricted area or access point, the verification and tracking system 115 may determine if the user 104 is authorized to access this second restricted areas of a building 102 and/or pass through an access point. The verification and tracking system 115 may then send the location data 109 in conjunction with the video data from the image sensors 107 to the video analysis system 120 for analysis. The video analysis system 120 may then analyze the location data 109 with the video data from the image sensors 107 to verify that the user is a proper user and to reidentify the user in other locations within the building 102. The video data may include date and time information indicating a time instance at which the visual content was captured by the corresponding video camera 107. The user 104 may be reidentified based on visual content criteria including video identification information. The video identification information may include, but is not limited to, facial image information and gait information of the users, and other physical characteristics that are possibly unique to the user such as clothing worn, hair color, height, a person's stature, and tattoos, in examples. The facial image information, in examples, may include one or more images of the user's face, or 2D or 3D vectors of facial landmarks associated with a person's facial image using facial recognition algorithms.

In an aspect, the verification and tracking system 115 may be configured to utilize a machine learning model for reidentification of authorized users 104. The machine learning model may, in some aspects, implement a plurality of video analysis models capable of performing distinct computer vision tasks and feature detection. Using the combined machine learning model, the one or more aspects of the present disclosure may function to process many aspects of video input, in parallel or synchronously, to achieve comprehensive detection results in real-time (or near real-time) and provide actionable intelligence for increased environment security and/or safety, rapid (real-time) emergency response and/or incident response, rapid threat response, and the like.

In case of a successful reidentification of the user 104, the video analysis system 120 may also identify a specific video camera 107 that provided video content that enabled reidentification of the user. In other words, the video analysis system 120 may identify the video camera 107 capturing the latest image of the user 104, implying that the identified video camera 107 is located in the vicinity of the second door controller 112. In an aspect, the video analysis system 102, may send information about the identified video camera 107 back to the verification and tracking system 115.

At 408, the verification and tracking system 115 may associate the identified video camera 107 with the door controller 112 that sent the latest access request for the specified user 104, if the date and time information in the user credential information substantially matches the date and time information in the corresponding visual content provided by the corresponding video camera 107. In other words, the verification and tracking system 115 automatically generates an association between an access control reader and a corresponding image and/or another security sensor monitoring the access point controlled by the access control reader. As noted above, in some cases there might be multiple image sensors associated with the same access control reader, if multiple image sensors monitor the same area. The association generated at 408 may be stored in mappings database 106. Steps 406 and 408 may be repeated continuously by the verification and tracking system 115 for a plurality of authorized users 104.

Advantageously, after generating a sufficient number of associations (at 410), the verification and tracking system 115 may automatically generate a correlation map 300 shown in FIG. 3. The generated correlation map may include a plurality of associations between a plurality of doors within the facility associated with the plurality of access control readers and the plurality of image sensors. Furthermore, the verification and tracking system 115 may generate various statistics indicative of strength of relationship between various security devices, as described above in conjunction with FIG. 3. It should be noted that date and time information could be used by the verification and tracking system 115 to define distance correlations, patterns, and ultimately the mapping. For example, if the distance between two different security sensors (determined over time) is less than 5 seconds, such short distance indicates a strong proximity (e.g., same exact location) for door and corresponding video camera 107. If the distance is greater than 5 seconds but less than seconds, for example, the verification and tracking system 115 may determine that the corresponding door and camera(s) are located within the same general area. However, if the distance between corresponding devices is about 20 minutes, such relationship simply indicates that the corresponding security devices might be located within the same building 102. However, such relationship is not likely to be used in response to a particular security event occurring at the site/building 102. It should be noted that a longer travel time between two security sensors may be due to a pause in transit. Overtime, as people continue to use the facilities the average or fastest travel time between security devices will correspond to "actual distances" between the devices.

In other words, a method 400 for automatically programming a security system comprising a plurality of access control readers and a plurality of image sensors includes receiving user credential information from a first access control reader. A first door associated with the first access control reader is further associated with a first image sensor. A user is identified based on the user credential information and based on visual content provided by the first image sensor. Upon receiving the user credential information from one or more access control readers of the plurality of access control readers different from the first access control reader, the user is reidentified based on visual content provided by one or more image sensors of the plurality of the image sensors. The image sensor that provided the visual content used for reidentification of the user with a door is associated with the access control reader that provided the user credential information.

In one or any combination of these aspects, the method may further include automatically generating a correlation map of a facility monitored by the security system. The generated correlation map may include a plurality of associations between a plurality of doors within the facility associated with the plurality of access control readers and the plurality of image sensors.

In one or any combination of these aspects, the user is reidentified based on visual content criteria comprising at least one of: user clothing color, user hair color, user height, user gait and user body shape.

In one or any combination of these aspects, reidentification of the user based on visual content further includes analysis of the visual content provided by the plurality of image sensors to identify the second image sensor capturing an image of the user.

In one or any combination of these aspects, upon receiving a security alert from one of the plurality of access control readers, using the automatically generated correlation map to identify an image sensor associated with the access control reader that generated the alert.

In one or any combination of these aspects, the method further includes associating one or more security devices located in a vicinity of the second door with the second image sensor.

In one or any combination of these aspects, the user credential information includes date and time information indicating a time instance at which the user provided a credential to a corresponding access control reader. The visual content provided by a corresponding image sensor includes date and time information indicating a time instance at which the visual content was captured by the corresponding image sensor. The user is reidentified in response to determining that the date and time information in the user credential information substantially matches the date and time information in the corresponding visual content provided by the corresponding image sensor.

Figure 5:
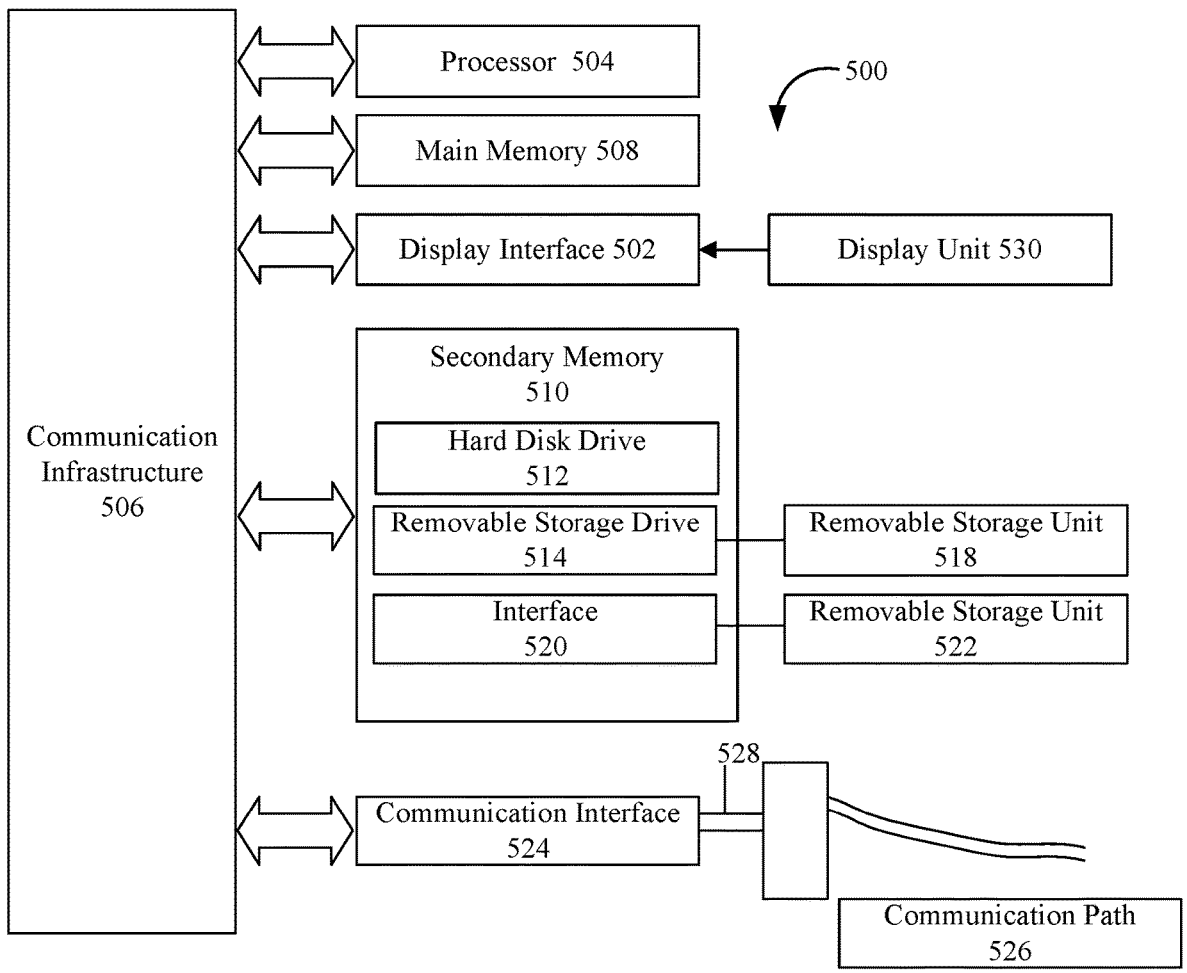
FIG. 5 is a block diagram of various hardware components and other features of an example security system in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 5 is an example of a block diagram illustrating various hardware components and other features of a computer system that may operate the performance monitoring module 140 in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 504, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 506, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP), and RS-485 interconnect among others.

Further, the connection between components of computer system 500, or any other type of connection between computer-related components described herein may be referred to an operable connection, and may include a connection by which entities are operably connected, such that signals, physical communications, and/or logical communications may be sent and/or received. An operable connection may include a physical interface, a data interface and/or an electrical interface.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

It should be understood that a memory, as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for automatically programming a security system comprising a plurality of access control readers and a plurality of image sensors, the method comprising:

receiving user credential information from a first access control reader, wherein a first door associated with the first access control reader is further associated with a first image sensor;

identifying a user based on the user credential information and based on first visual content provided by the first image sensor;

upon receiving the user credential information from one or more access control readers of the plurality of access control readers different from the first access control reader, reidentifying the user based on second visual content provided by one or more image sensors of the plurality of image sensors;

associating a second image sensor that provided the second visual content used for reidentification of the user with a second door associated with a second access control reader that provided the user credential information; and automatically generating a correlation map of a facility monitored by the security system wherein the correlation map comprises a plurality of associations between a plurality of doors within the facility associated with the plurality of access control readers and the plurality of image sensors.

2. The method of claim 1, wherein the user is reidentified based on visual content criteria comprising at least one of: user clothing color, user hair color, user height, user gait, and user body shape.

3. The method of claim 2, wherein reidentifying the user based on the second visual content further comprises analyzing the second visual content provided by the plurality of image sensors to identify the second image sensor capturing an image of the user.

4. The method of claim 1, further comprising:

upon receiving a security alert from one of the plurality of access control readers, using the correlation map to identify a third image sensor associated with a third access control reader that generated the security alert.

5. The method of claim 4, further comprising:

upon receiving the security alert, using the correlation map to identify one or more of the plurality of image sensors in a vicinity of the third access control reader that generated the security alert to determine current location of an unauthorized user.

6. The method of claim 1, further comprising associating one or more security devices located in a vicinity of the second door with the second image sensor.

7. The method of claim 1, wherein the user credential information provided by the second access control reader includes first year date and time information indicating a first time instance at which the user provided a credential to the second access control reader, wherein the second visual content provided the second image sensor includes second date and time information indicating a second time instance at which the second visual content was captured by the second image sensor, and wherein the user is reidentified in response to determining that the first date and time information in the user credential information provided by the second access control reader substantially matches the second date and time information in the second visual content provided by the second image sensor.

8. The method of claim 1, wherein the correlation map includes numerical values indicative of a strength of the plurality of associations between the plurality of doors within the facility associated with the plurality of access control readers and the plurality of image sensors.

9. A system for automatically programming a security system comprising a plurality of access control readers and a plurality of image sensors comprising:
- a hardware processor; and
- memory including instructions that, when executed by the hardware processor, cause the system to:
  - receive user credential information from a first access control reader, wherein a first door associated with the first access control reader is further associated with a first image sensor;
  - identify a user based on the user credential information and based on first visual content provided by the first image sensor;
  - upon receiving the user credential information from one or more access control readers of the plurality of access control readers different from the first access control reader, reidentify the user based on second visual content provided by one or more image sensors of the plurality of image sensors;
  - associate a second image sensor that provided the second visual content used for reidentification of the user with a second door associated with a second access control reader that provided the user credential information; and
  - automatically generate a correlation map of a facility monitored by the security system, wherein the correlation map comprises a plurality of associations between a plurality of doors within the facility associated with the plurality of access control readers and the plurality of image sensors.

10. The system of claim 9, wherein the user is reidentified based on visual content criteria comprising at least one of: user clothing color, user hair color, user height, user gait, and user body shape.

11. The system of claim 9, wherein the instructions causing the system to reidentify the user based on the second visual content further cause the system to analyze the second visual content provided by the plurality of image sensors to identify the second image sensor capturing an image of the user.

12. The system of claim 9, wherein the instructions further cause the system to use, upon receiving a security alert from one of the plurality of access control readers, the correlation map to identify a third image sensor associated with a third access control reader that generated the security alert.

13. The system of claim 12, wherein the instructions further cause the system to use, upon receiving the security alert, the correlation map to identify one or more image sensors in a vicinity of the third access control reader that generated the security alert to determine a current location of an unauthorized user.

14. The system of claim 9, wherein the instructions further cause the system to associate one or more security devices located in a vicinity of the second door with the second image sensor.

15. The system of claim 9, wherein the user credential information provided by the second access control reader includes first date and time information indicating a first time instance at which the user provided a credential to the second access control reader, wherein the second visual content provided by the second image sensor includes second date and time information indicating a second time instance at which the second visual content was captured by the second image sensor, and wherein the user is reidentified in response to determining that the first date and time information in the user credential information provided by the second access control reader substantially matches the second date and time information in the second visual content provided by the second image sensor.

16. The system of claim 9, wherein the correlation map includes numerical values indicative of a strength of the plurality of associations between the plurality of doors within the facility associated with the plurality of access control readers and the plurality of image sensors.

\* \* \* \* \*